United States Patent [19]

Hönes et al.

[11] 4,449,598

[45] May 22, 1984

[54] METHOD AND APPARATUS FOR STEERING A VEHICLE WITH FIXED-POSITION WHEELS

[75] Inventors: Helmut Hönes, Korntal; Hubert Mohaupt, Bietigheim, both of Fed. Rep. of Germany

[73] Assignee: Robert Bosch GmbH, Stuttgart, Fed. Rep. of Germany

[21] Appl. No.: 390,205

[22] Filed: Jun. 21, 1982

[30] Foreign Application Priority Data

Sep. 8, 1981 [DE] Fed. Rep. of Germany ..... 13135485

[51] Int. Cl.³ .............................................. B62D 11/02

[52] U.S. Cl. .................................... 180/6.5; 180/6.28; 318/9

[58] Field of Search ....................... 180/6.5, 6.28, 6.48; 318/9

[56] References Cited

U.S. PATENT DOCUMENTS

| | | | |
|---|---|---|---|
| 4,102,292 | 7/1978 | Hunter et al. | 180/6.5 |
| 4,196,785 | 4/1980 | Downing, Jr. | 180/6.28 |
| 4,281,734 | 8/1981 | Johnston | 180/6.5 |

*Primary Examiner*—Joseph F. Peters, Jr.
*Assistant Examiner*—Kenneth R. Rice
*Attorney, Agent, or Firm*—Frishauf, Holtz, Goodman & Woodward

[57] ABSTRACT

To control the turning direction of a vehicle having wheels with fixed axles or tracks at the respective sides of the vehicle, a steering wheel (1) is coupled to a wheel position transducer (11); a direction control lever (2) is coupled to a position transducer (12), providing forward and reverse (F-REV) driving direction signals. The signals are so arranged that, for turning in respectively opposite directions, signals of positive or negative polarity, with a level varying with the turning radius, are provided; for forward or reverse, respectively, signals of varying polarity are provided. The turning direction signal and the driving direction signal are processed including addition and subtraction, to control independent drive motors (4, 6; 5, 7) at the respective right and left (R-L) sides of the vehicle such that the motor at the inside of the curve will receive a signal which has a lesser algebraic value than the driving direction signal, and the motor at the outside of the curve will receive only the driving direction signal, to cause the wheel at the inside of the curve to rotate slower, or with reverse direction of rotation than that at the outside of the turning circle.

12 Claims, 2 Drawing Figures

METHOD AND APPARATUS FOR STEERING A VEHICLE WITH FIXED-POSITION WHEELS

Figure 1:
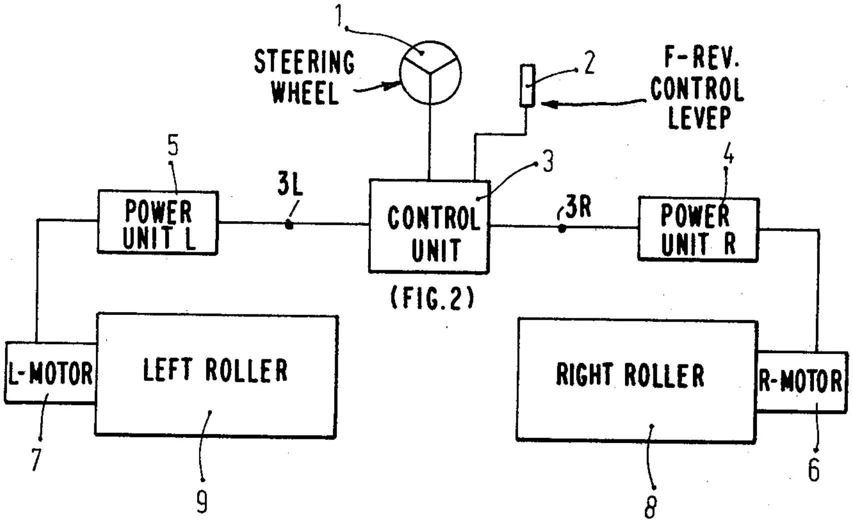

The present invention relates to steering of vehicles which have rolling elements at either side which are fixed with respect to the vehicle, so that steering of the vehicle can be effected by driving the wheels at the respective sides at different speeds.

BACKGROUND

Steering arrangements for vehicles in which the wheels are fixed in orientation with respect to the vehicle are known. Such steering arrangements are used, for example, by rolled rollers, steam rollers, tracked vehicles, and the like. Many types of steering arrangements use separate motors driving the respective wheels at the sides of the vehicle. Usually, two levers are provided, one lever each controlling the motor at a respective side of the vehicle, that is, controlling either its forward speed or braking thereof. By reducing the speed of the wheel at one side of the vehicle, and maintaining the speed at the other side constant, or even accelerating, the vehicle will operate in a curved path. Frequently, the arrangement is so made that the wheels on one side are being braked, while the wheels at the other side are being driven. Braking one side of the wheels is wasteful of energy, since braking requires changing of dynamic energy from the vehicle to heat.

Operation of such vehicles, whether they are tracked or on rollers or wheels requires special training since the type of steering with which most operators are familiar, exemplified by the steering wheel of an automobile, is not used; rather, control levers for the engines of the motors for the wheels at the respective sides of the vehicles are provided.

It has already been proposed, for example in military vehicles, to control the direction of operation of the vehicle by a lever which, in dependence thereof, switches a hydrodynamic drive so that the driving power supplied by an engine is supplied to the tracks at the respective sides of the vehicle in uneven or unequal relation. Hydrodynamic drives of this type are expensive. They are not suited for application to commercial vehicles where cost is a substantial factor.

THE INVENTION

It is an object to provide a method and an apparatus to steer vehicles having wheels which are rigidly oriented with respect to the vehicle by controlling the speeds of the wheels in a particular manner in order to operate the vehicle either in a straight line, or along curved paths, and permitting control by a steering wheel.

Briefly, a steering wheel is coupled to a wheel position transducer which provides a right-left turning output signal. Further, a direction control lever is provided furnishing a forward-reverse direction signal. The wheels at the two sides of the vehicle are driven by separate motors, which may be electrical motors, hydraulic motors, or the like.

The right-left turning signal derived from the wheel position transducer is multiplied, for example in a signal multiplier, and a combined signal is obtained. The combined signal is added, for example in an adding amplifier, to the direction signal to obtain a first turning direction signal; the combined signal is also subtracted from the direction signal, for example in a differential amplifier, to obtain a second turning direction signal. The motors controlling the wheels at the inside of the curve intended to be followed is controlled in dependence on either the first or the second turning signal. The wheel at the outside of the curve, in turning direction, is controlled only in dependence on the direction signal.

In accordance with a feature of the invention, the right-left turning signal is provided in form of a signal having a magnitude which depends on the radius of curvature intended to be followed by the vehicle, thus, is dependent on the amount of turning of the steering wheel. The polarity of this turning signal depends on the direction in which the turn is to be taken, that is, towards the right or towards the left with respect to a central axis of the vehicle. The forward-reverse direction signal is a signal which changes in polarity, the polarity depending on the selected direction—forward, or reverse, respectively. Multiplication of the turning signal and the direction signal, thus, will result in a combined signal having very specific polarity relationships with respect to the direction signal; the addition or subtraction of the combined signal from the direction signal is carried out with attention to the polarities—by inclusion of suitably poled diodes in the circuit for example—such that the signal controlling the motor driving the wheel at the inside of the curve will always be algebraically less than the signal at the outside of the curve.

In accordance with a feature of the invention, the signal level of the combined signal, that is, the multiplied turning and direction signal, is doubled before the adding or subtracting step is carried out. Thus, it is possible to obtain reversal of the direction of the motor driving the wheel at the inside of a turning radius, thus permitting a vehicle to turn about its own center axis by reversely operating the wheels at either side of the vehicle.

The system has the advantage that a customary steering wheel can be used to control the direction of the vehicle, in which the angle of deflection of the steering wheel can be made proportional to the curvature over which the vehicle is to operate. At maximum wheel deflection, the vehicle can turn about its own axis. The system has the additional advantage of simplicity, since the required control signal can be easily obtained electrically; hydraulic signals can also be used.

The wheels of the vehicle are driven by individual drive motors, preferably by electrical motors. This permits a simple structural and circuit arrangement.

Stability can easily be obtained by including in the evaluation circuitry summing amplifiers which have a feedback path which includes a further differential amplifier which receives on one input the output from the summing amplifier and, at the other input, the respective first or second turning direction signal derived by summing or subtracting, respectively, the combined signal and the direction signal. Including a diode network with reversely polarized diodes, and connecting the respectively reversely connected diodes in accordance with the polarity of the direction signal results in a particularly simple and effective arrangement in which the drive motors for the wheels or rolling elements—which may, for example, be road rollers, tracks, or the like, are appropriately controlled for the selected vehicle road speed as well as the curvature about which the vehicle is to operate.

DRAWINGS

Figure 2:
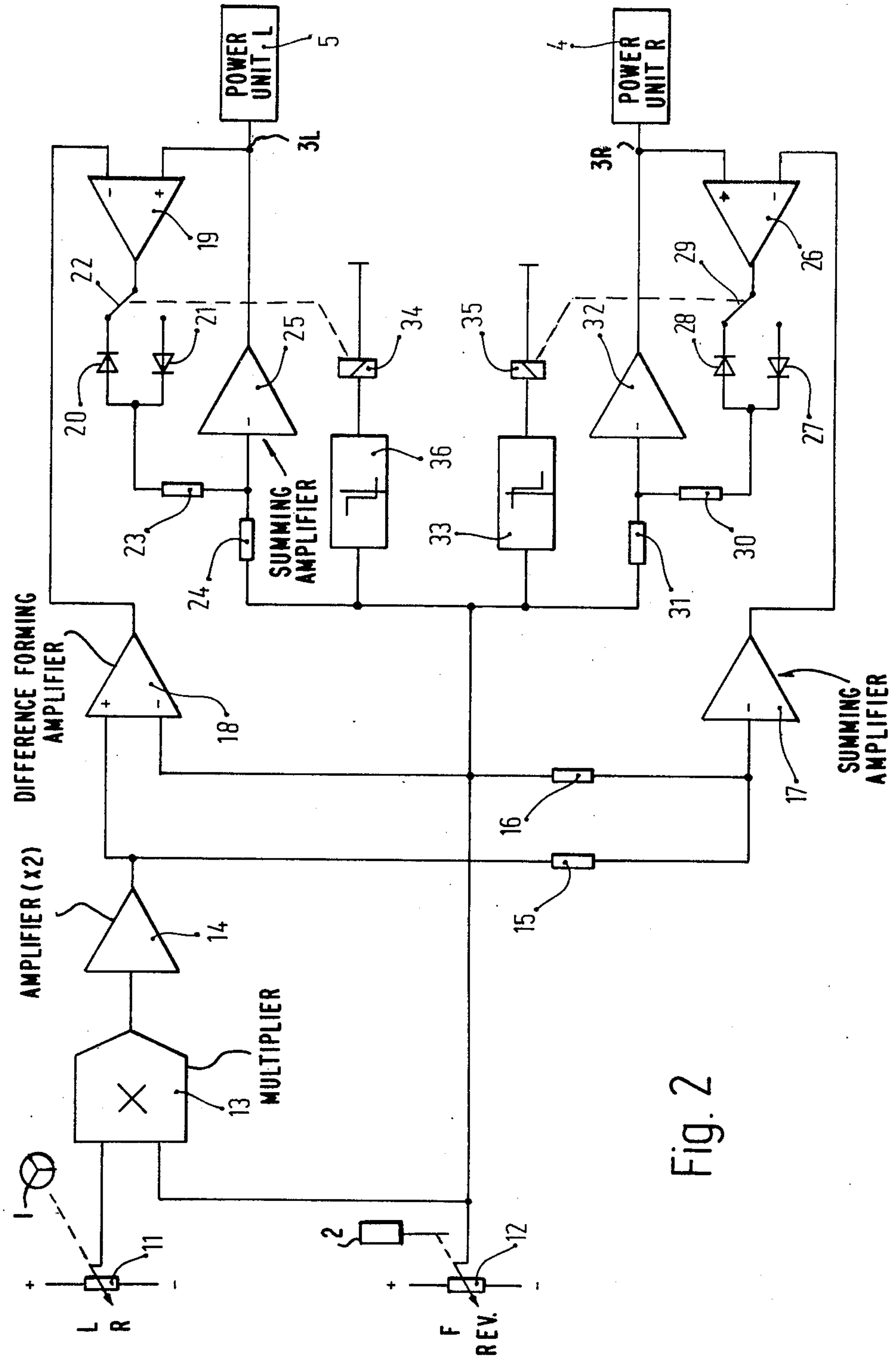

FIG. 1 is a schematic diagram illustrating the general construction of a control system, applied to a road roller; and FIG. 2 is a detail diagram of the electronic control unit to control the drive motors of the system of FIG. 1.

A steering wheel 1 is used to control the direction of movement of a road roller. A forward-reverse drive lever 2 is also utilized to provide control of the movement of the vehicle and in a selected direction. The steering wheel 1 as well as the control lever 2 which is a forward-reverse (F-REV) lever, has transducers 11, 12 (FIGS. 1,2) coupled thereto which are connected to an electronic control unit 3 (FIG. 2). The electronic control unit has two output lines 3L, 3R which are connected a right power amplifier unit 4 and a left power amplifier unit 5. The power amplifier units 4, 5, which also include power control units, control the direction as well as speed of the respective drive motors 6, 7 at the right and left side of the vehicle coupled, each, to road rolls 8, 9, respectively, at the right and left side of the vehicle.

The motors 6, 7 and be electric motors; hydraulic drives can also be used, in which case the power units 4, 5 must include electric signal—hydraulic control conversion apparatus, which may be of any well known and suitable structure, for example electrically controlled hydraulic valves which, in turn, control hydraulic servo power connections. No special control levers to control the drive motors 6, 7 are provided; the steering wheel 1, in combination with the position F-REV lever 2 provides for steering of the vehicle (not shown) in which the system is incorporated.

The control unit 3 is shown in detail in FIG. 2. Transducer 11 is coupled to the steering wheel 1. Transducer 11 is constructed in form of a potentiometer which is connected between a source of positive and negative voltage. If the potentiometer slider is exactly in the middle, which corresponds to the center position of the steering wheel 1, a zero output signal will be derived from the potentiometer.

The system can be used with any polarity arrangement.

The convention which will be utilized in explaining the example is this:

If the tap or slider of the potentiometer 11 has a negative signal, the steering wheel 1 has been rotated to cause drive towards the right. If drive towards the left is desired, the output signal of the potentiometer 11 will be positive with respect to a reference.

The F-REV control lever 2 is likewise coupled to a potentiometer forming a transducer therefor. Potentiometer 12 provides output at its slider which will be in accordance with this convention: If the output signal is positive, direction of movement of the motors to drive the vehicle is towards forward; if it is intended to move the vehicle in reverse, lever 2 is placed so that the output from the slider of potentiometer 12 will be negative. FIG. 2 shows, schematically, the direction of turning L-R (left-right) adjacent the potentiometer 11 and F-REV (forward, reverse) adjacent potentiometer 12 at the respective polarity connections therefor.

The output signal derived from the slider of potentiometer 11 and from the slider of potentiometer 12 are both connected to the multiplying inputs of a multiplier 13 to be multiplied thereby. The output of the multiplier 13 is connected to an amplifier 14 which, preferably, carries out an amplification with a factor of two (2). The output of amplifier 14 is connected:

(a) to the direct input of a differential amplifier 18 and, (b) through a coupling resistor 15, to the inverting input of a summing amplifier 17. The direction or drive signal derived from the slider 12 is connected over a coupling resistor 16 with the inverting input of the summing amplifier 17 and, further, with the inverting input of the differential amplifier 18.

The output of the differential amplifier 18 is connected to the inverting input of a differential amplifier 19. The output of differential amplifier 19 is connected to a transfer switch 22. Transfer switch 22 can switch, respectively, between either a diode 20 or a diode 21, the diodes 20, 21 being reversely polarized. The output from the diodes 20, 21, coupled together, is connected through a coupling resistor 23 to the inverting input of a summing amplifier 25. Transfer switch 22 is operated by the coil of a relay 34. The direction signal 12 is further coupled to the input of the summing amplifier 25 through coupling resistor 24. The output of the summing amplifier 25 is connected to the direct input of the differential amplifier 19 on the one hand and, on the other, forms the terminal 3L, for connection to the power unit 5 to control the operation of the left motor 7. The direction of rotation of motor 7 is dependent on the polarity of the output signal. A negative output signal means that the motor drives the vehicle forwardly; a positive output signal drives the motor to cause the vehicle to move backwardly. The level of the output signal controls the speed of the motor. No output signal means that the motor is stopped. The components 18–25 form a first control channel for the left motor driving the left roller 9.

A second channel is provided for the power unit 4 for the right motor 6 and the right roller 8. The output of the summing amplifier 17, which sums the multiplied signal and the drive direction signal, is connected with the inverting input of differential amplifier 26. The general arrangement of the second channel is similar to that of the first channel. The output of differential amplifier 26 is connected through transfer switch 29, the position of which is controlled by a relay coil 35 to a pair of diodes 27, 28 connected in parallel at their output and inversely poled with respect to each other. The output is connected via coupling resistor 30 to the negative input of summing amplifier 32. The summing amplifier 32 receives a second summing signal from coupling resistor 31, directly from the forward-reverse transducer 12, so that the direction signal is added to the previously combined signal formed by the multiplied signal and the direction signal. The output of summing amplifier 32 is connected with the direct input of differential amplifier 26. Additionally, the output of summing amplifier 32 forms the output terminal 3R which controls the right power unit 4 which, in turn, controls the right motor 6 driving the right roller 8. The drive to the right motor 8 is forward if the input to the power unit 4 is negative. The drive to the right motor 8 is in the reverse when the input to the power unit 4 is positive.

The position of the transfer switches 22, 29 is controlled by relays 34, 35. The slider of the transducer potentiometer 12, which provides the forward-reverse directional signal, is connected to two Schmitt triggers 36, 33. Schmitt trigger 36 switches relay 34; Schmitt trigger 33 switches relay 35. In unenergized, normal position, the transfer switches 22, 29 are in the position shown.

Basic operating concept: Let it be assumed, first, that the vehicle is to go straight forward. Steering wheel 1 is in the central position. This places the transducer 11 in central or neutral position. The motors will be solely controlled by the drive signal derived from transducer 12. For straight running, the motors driving the left as well as the right roller must operate the rollers at the same speed.

Upon operation of the steering wheel, the doubled product of steering and drive signal, depending on polarity, is added or subtracted, respectively, from the drive signal. The evaluation circuits, which are switched in dependence on the position of the switches 22, 29, and hence either render diodes 20, 28, or 21, 27 active, and which act as a lowest value or as a peak value transfer circuit, have the effect that, when a curve path is commanded, the wheel or drive at the outer side of the curve is not influenced, but the wheel or drive at the inner side of the curve receives a reduced signal. By doubling the signals derived from multiplier 13 in the amplifier 14, a steering ratio is obtained which will cause the drive at the inner side of the curve to stop when the steering wheel has been turned to half its maximum excursion. Upon further rotation of the steering wheel, the drive at the inner side of the curve will reverse until, at maximum steering wheel excursion, the inner drive will operate with approximately the same speed as the outer one, but in opposite direction. Consequently, the vehicle will turn about its own axis, passing vertically through a line connecting the two wheels. The speed of curved running, or the rotation, respectively, is determined by the drive signal of potentiometer 12. Multiplication of the steering signal with the drive signal has the effect that, with a given excursion of the steering wheel 1, the radius of curvature will be same regardless of the speed of operation of the vehicle.

Detailed operation, with reference to FIG. 2:

EXAMPLE 1

The command is maximum speed forward, straight ahead. Potentiometer 12 will provide a maximum forward signal, that is, a maximum positive signal in accordance with the convention established in the example. The signal from transducer 11 will be zero, since the vehicle is to operate straight forward, which requires that the steering wheel 1 is in its central or neutral position. Multiplication of the drive signal in multiplier 13 with the value zero will, of course, result in an output signal from the multiplier 13 which is likewise zero. Thus, the R-L (right-left) turning signal will not contribute any values for further evaluation in the two evaluation channels. The Schmitt triggers 33, 36 are in their OFF or zero state, so that the relay coils 34, 35 are de-energized, which means that the switches 22, 29 are in the full-line position as shown. Consequently, current can pass only through diodes 20, 28. Resistors 24, 31 will have the drive signal applied thereto. The inverting input of the differential amplifiers 26 and 19 will have the negative drive signal applied, since the amplifiers 17, 18, inherently, reverse polarity of the input signal. The output of the summing amplifiers 25, 32 thus provide control signals for the power units 4, 5 in accordance with the drive control signal, but with inverse polarity, since the signal applied over the resistors 24, 31, and amplified in amplifiers 25, 32, was polarity-reversed. Consequently, the output of the differential amplifiers 19, 26 will have a logic 0-signal appear thereat which is applied over resistors 23, 30, respectively, and will thus have no influence on the input to the summing amplifiers 25, 32. Consequently, the two outputs of the summing amplifiers 25, 32 will have the negative control signal applied thereto which, in accordance with the convention stated, so controls the power units 4, 5 that forward running is commanded.

EXAMPLE 2—half left turn

The steering wheel 1 is turned for half of its excursion towards the left. The drive lever 2 is so adjusted that full speed forward is commanded. The half turn of the steering wheel causes the potentiometer 11 to be placed in such a position that half of the positive voltage is available as a steering command signal. This voltage is multiplied in the multiplier 13 with the full positive drive signal, so that the output of the multiplier 13 will have half positive voltage applied. This is doubled in the amplifier 14, which has an amplification factor of two, so that the output of the amplifier 14 will have a positive signal which corresponds to the full positive voltage of potentiometers 11, 12. The direct input of differential amplifier 18 will have the same signal applied which is also applied to the inverting input of the summing amplifier 17. The same signal, however, is also applied through coupling resistor 16 to the inverting input of differential amplifier 18. Consequently, since the signals at the differential amplifier 18 are the same, the output signal therefrom is zero. This 0-signal is applied to the input of differential amplifier 19.

The drive command signal from potentiometer 12, fully positive, is applied over coupling resistor 24 to the input of summing amplifier 25. The output signal of the summing amplifier 12 cannot be less negative than null, since then, due to the high amplification of the differential amplifier 19, diode 20 becomes conductive and the signal on resistor 24 over resistor 23 so compensates until at the output of the amplifier 25 and together on the direct input of amplifier 19, the same signal will appear as on the inverting input of amplifier 19. The power unit 5 for the left wheel, thus, will not have a signal applied thereto or, in other words, the signal will be a null signal. Consequently, the left drive is stationary. The motor is stopped.

The second channel which, in this case, is the outer curved channel, starts with the summing amplifier 17, which receives the drive signal over coupling resistor 16 and the multiplied signal over resistor 15. These signals are algebraically additively combined so that the output of the summing amplifier 17 will have twice the drive signal appear thereat. This double-drive signal is applied—with inversion due to the inverting effect of the summing amplifier 17—to the inverting input of differential amplifier 26. Coupling resistor 31 applies the full value drive signal to the input of summing amplifier 32, and appears as a negative signal at the output. From there, it is applied to the power unit R and to the direct input of the differential amplifier 26. The negative drive signal of double amplitude on the inverting input of the the differential amplifier 26 is dominant and causes a positive output signal. Due to diode 28, and the position of switch 29, this positive signal cannot be applied to the input of the summing amplifier 32—the diode 28 being reversely polarized with respect thereto. Consequently, the output of the summing amplifier 32, and thus the input of the power stage for the right drive of the vehicle, will have only the negative drive signal applied thereto, which means that, in this mode, the right wheel will move forwardly without change in speed.

EXAMPLE 3—turning about vehicle axis

If, in the Example 2, the steering wheel 1 is turned to the full excursion or rotation towards the left side, that is, to bring the slider of potentiometer 11 to the maximum positive voltage point, multiplier 13 will multiply the full forward signal from transducer 12 with the full "left" signal from transducer 11. This signal, when multiplied in amplifier 74 by two will apply a signal to the differential amplifier 19, which is transferred to the summing amplifier 25 in such a direction that the summing amplifier 25 will provide a positive output signal. This causes reversal of the direction of rotation of the left rollers or wheels so that the wheels on the left side will rotate backwardly, whereas the wheels on the right side continue to rotate forwardly. Reverse rotation of the wheels on the left side, with forward rotation of the wheels on the right side, will cause turning of the vehicle about its own central axis perpendicular to a line connecting the wheels of the vehicle.

The direction of movement of the vehicle is controlled by the signal from transducer 12. If the direction of movement of the vehicle is changed, that is, if the signal derived from potentiometer 12 is negative, relays 34, 35 will switch over, so that the signal from the output of differential amplifiers 19 and 16 will then be transferred over diodes 21, 27, and the resistors 23, 30 to the summing amplifiers 25, 32. In principle, the operation of the circuit will be the same. The signals applied to the power units 4, 5 will have the reverse polarity, thus properly commanding the desired reverse direction of movement of the vehicle.

The network including the summing amplifiers 25, 32, as well as the differential amplifiers 19, 26, together with the diode networks 20, 28; 21, 27, and the coupling resistors 23, 30, so operate that, if the steering wheel 1 commands movement of the vehicle towards the left, the output signal of the summing amplifier 25, which provides the control signal for the power unit 5, will have the same polarity and level as the signal at the inverting input of the differential amplifier 19. During left turn, then, the negative drive signal, however, applied to the power unit 4 by the summing amplifier 32 will be retained.

If the steering wheel 1 is turned to the right, the elements 19, 25, as well as the diode networks 20, 21, switch 22 and coupling resistor 23, cause the inverted drive signal to be maintained.

The network including amplifiers 26, 32, the diodes 27, 28, transfer switch 29 and coupling resistor 30, at forward or reverse movement, so operate that, if the steering wheel 1 is turned towards the right, so that the output from transducer 11 will be a negative signal, the output signal from the summing amplifier 32 which forms the control signal for power unit 4 will set itself to the same level and polarity as the signal at the inverting input of the differential amplifier 26. At that time, the reverse polarity drive signal applied to the power unit 5, however, will be maintained, thus causing normal speed at the outside wheel of the curve, and algebraically lesser speed, which includes direction reversal of movement of the wheel at the inside of the curve.

The entire network can be constructed in form of an integrated circuit. Various changes and modifications may be made, and it is of course equally possible to change the polarity convention from that selected for the operating example in accordance with well known network design.

We claim:

1. Method of steering a vehicle in a predetermined path which includes a curve, having right (R) and left (R) rotating drive elements or wheels (8, 9) at the sides of the vehicle, respectively, by controlling the speed and direction of rotation of the wheels, having a steering wheel (1) and a steering wheel position transducer (11) coupled thereto and providing a right-left (R-L) turning signal;

a direction control element (2) and a control element position transducer (12) coupled thereto and providing a forward-reverse (F-REV) direction drive signal;

and separate drive motors (6, 7) controlling the respective rotation of the L and R wheels (8, 9), comprising the steps of multiplying the turning signal and the direction signal and obtaining a combined signal;

adding said combined signal to the direction signal and obtaining a first turning control direction signal;

subtracting said combined signal from the direction signal and obtaining a second turning control direction signal;

controlling the wheel at the inside of the curve by, selectively, the first or the second turning control direction signal, respectively, in dependence on the relative level thereof;

and controlling the wheel at the outside of the curve of the turning direction in dependence on the driving direction signal.

2. Method according to claim 1, including the step of generating the right-left turning signal in form of a signal having a polarity which depends on the selected direction of turning, and a magnitude which is representative of the turning radius.

3. Method according to claim 1, including the step of generating the forward-reverse driving direction signal in form of a signal having a polarity which depends on the selected forward or reverse direction of movement of the vehicle.

4. Method according to claim 2, including the step of generating the forward-reverse driving direction signal in form of a signal having a polarity which depends on the selected forward or reverse direction of movement of the vehicle;

and wherein the steps of adding, and subtracting, respectively, the combined signal and the driving direction signal comprises adding, or subtracting, respectively, the signals with polarities so controlled that the first or second turning control direction signal controlling the wheel at the inside of the curve will be algebraically less than the respective driving direction signal controlling rotation of the wheel at the outside of the curve.

5. Method according to claim 1 or 4, including the step of doubling the level of the combined, multiplied signal prior to the respective adding and substracting steps.

6. Method according to claim 1, wherein the step of controlling the wheel at the inside of the curve comprises comparing the first and second turning control direction signals, and controlling the wheel with that one of the turning control direction signals which has an algebraically lesser value.

7. Method according to claim 6, wherein the step of controlling the wheel at the inside of the curve additionally comprises generating, in said subtracting step, a second turning control direction signal which, after rotation of the steering wheel beyond a predetermined amount from a center position, changes sign, and hence will predominate and form the algebraically lesser value;

and the step of controlling the wheel at the inside of the curve comprises controlling rotation of the wheel with the sign-inverted signal, and hence controlling the wheel to rotate in a direction opposite the direction commanded by the direction control element, whereby the wheel at the inside of the curve and the wheel at the outside of the curve will rotate in opposite directions.

8. Apparatus for steering a vehicle having right and left wheels (8, 9) at respective sides of the vehicle, by controlling the speed and direction of rotation of the wheels to steer the vehicle in a path which includes a curve, a steering wheel (1) and a wheel position transducer (11) coupled thereto and providing a right-left (R-L) turning signal;

a direction control element (2) and a control element position transducer (12) coupled thereto and providing a forward-reverse (F-REV) driving direction signal;

separate drive motors (4, 6; 5, 7) controlling the respective rotation of the left and right wheels (8, 9) and comprising, in accordance with the invention, a multiplier (13) connected to receive the turning signal and the driving direction signal, and multiplying said signals to obtain a multiplied, combined signal;

an adder or summing circuit (15, 16, 17) connected to receive the multiplied, combined signal and the driving direction signal, and providing a first turning control direction signal;

a subtracting circuit (18) connected to receive the combined, multiplied signal and the driving direction signal and providing a second or difference turning control direction signal;

a first evaluation channel (19–25) connected to receive the second turning control direction signal and the driving direction signal;

a second evaluation channel (26–32) connected to receive the first turning control direction signal and the driving direction signal, said evaluation channels including polarity responsive signal level detection means (20, 21, 23, 24; 27, 28, 30, 31) so polarized that the wheel at the inside of the curve will be controlled, selectively, as a function of the first or the second turning control direction signal and which has the lesser value than the driving direction signal, and the wheel at the outside of the curve will be controlled by the driving direction signal, to control the motor (6, 8; 7, 9) of the wheel at the inside of the curve to operate at an algebraically lesser speed than the wheel at the outside of the curve and thus effect turning of the vehicle by differential speed drives being applied to the respective wheels.

9. Apparatus according to claim 8, further including an amplifier (14) receiving the output from the multiplier (13) and amplifying the multiplied signal by a predetermined amplification factor.

10. Apparatus according to claim 9, wherein said amplifier enhances the signal derived from the multiplier by a factor of two.

11. Apparatus according to claim 8, wherein said evaluation channels are essentially similar and constructed symmetrically;

each one of the evaluation channels includes a summing amplifier (25, 32) having a feedback path, the feedback path each including a differential amplifier (19, 26), having applied to one input the respective first or second turning control direction signal, and to another input the output signal from the respective summing amplifier (25, 32);

a diode network (20, 21; 27, 28), each comprising respectively reversely polarized diodes (20, 21; 27, 28) having their outputs connected to the inputs of the respective summing amplifier (25, 32);

and transfer switch means (22, 29) switching the output of the respective differential amplifier (19, 26) to the one or other of the respectively reversely polarized diode (20, 21; 27, 28) in dependence on sensed polarity of the driving direction signal.

12. Apparatus according to claim 8, wherein said position transducer (11) is connected to provide output signals of varying polarity and intensity in dependence on the direction of turning and the turning radius of turning to be executed by the vehicle;

said control element position transducer is connected to provide output signals changing in polarity in dependence on commanded forward or reverse driving direction of the vehicle;

an amplifier (14) is provided having an amplification factor of two, and being connected to amplify the multiplied signal derived from the multiplier (13) by doubling the signal level to provide signals to the summing or adding circuit (17) and the subtracting or difference forming circuit (18), respectively, to the respective evaluation channels having predetermined limits.

* * * * *

UNITED STATES PATENT AND TRADEMARK OFFICE

CERTIFICATE OF CORRECTION

PATENT NO. : 4,449,598

DATED : May 22, 1984

INVENTOR(S) : Helmut HONES et al

It is certified that error appears in the above-identified patent and that said Letters Patent is hereby corrected as shown below:

On the title page,
The Foreign Application Priority Number should be -- 3135485 --

Claim 1, Column 8, Line 12: "Drive" should be -- driving --.

Signed and Sealed this

*Twelfth* Day of *March 1985*

[SEAL]

*Attest:*

DONALD J. QUIGG

*Attesting Officer* *Acting Commissioner of Patents and Trademarks*